Jan. 6, 1942. K. H. ANDREN ET AL 2,269,330
COUNTER
Filed June 24, 1938 3 Sheets-Sheet 2
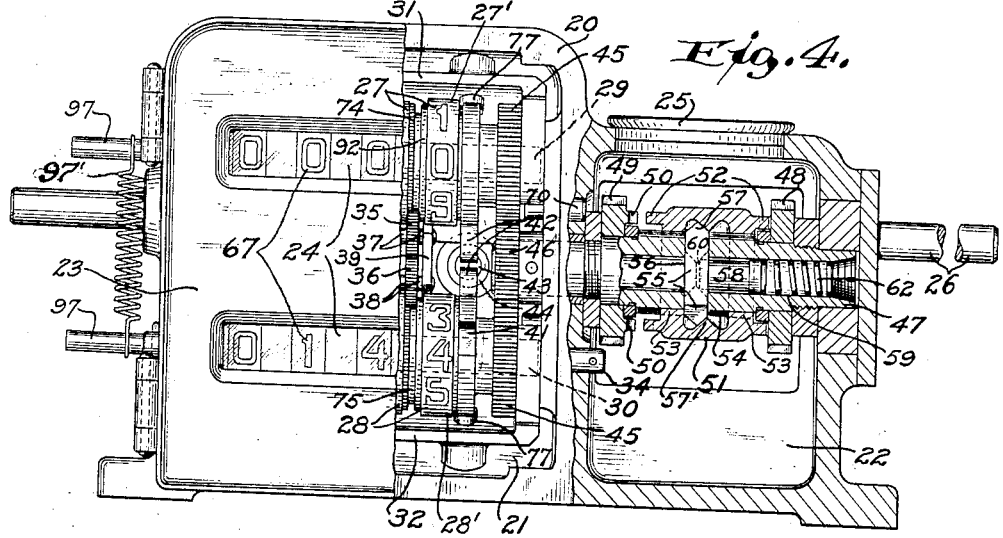
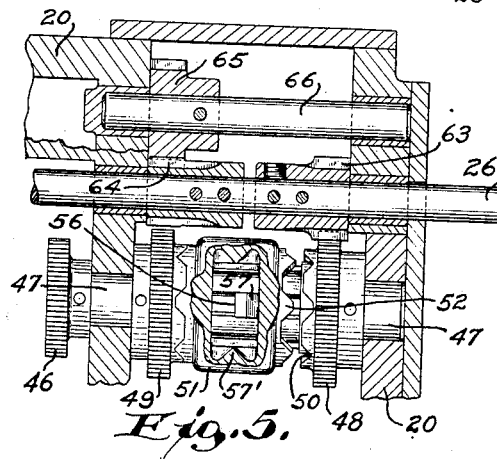
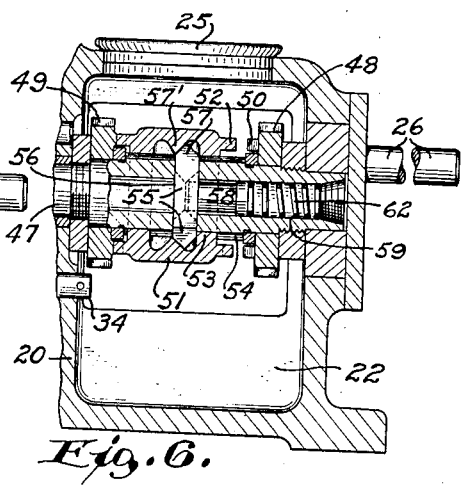
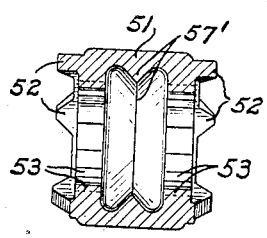
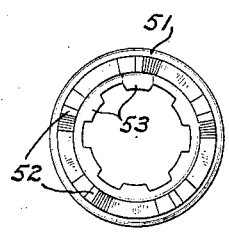
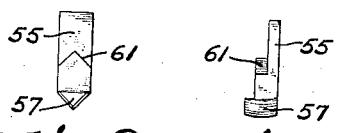
INVENTORS
K. H. Andren
BY K. J. Papke
Morsell, Lieber & Morsell
ATTORNEYS.

Jan. 6, 1942.   K. H. ANDREN ET AL   2,269,330
COUNTER
Filed June 24, 1938   3 Sheets-Sheet 3
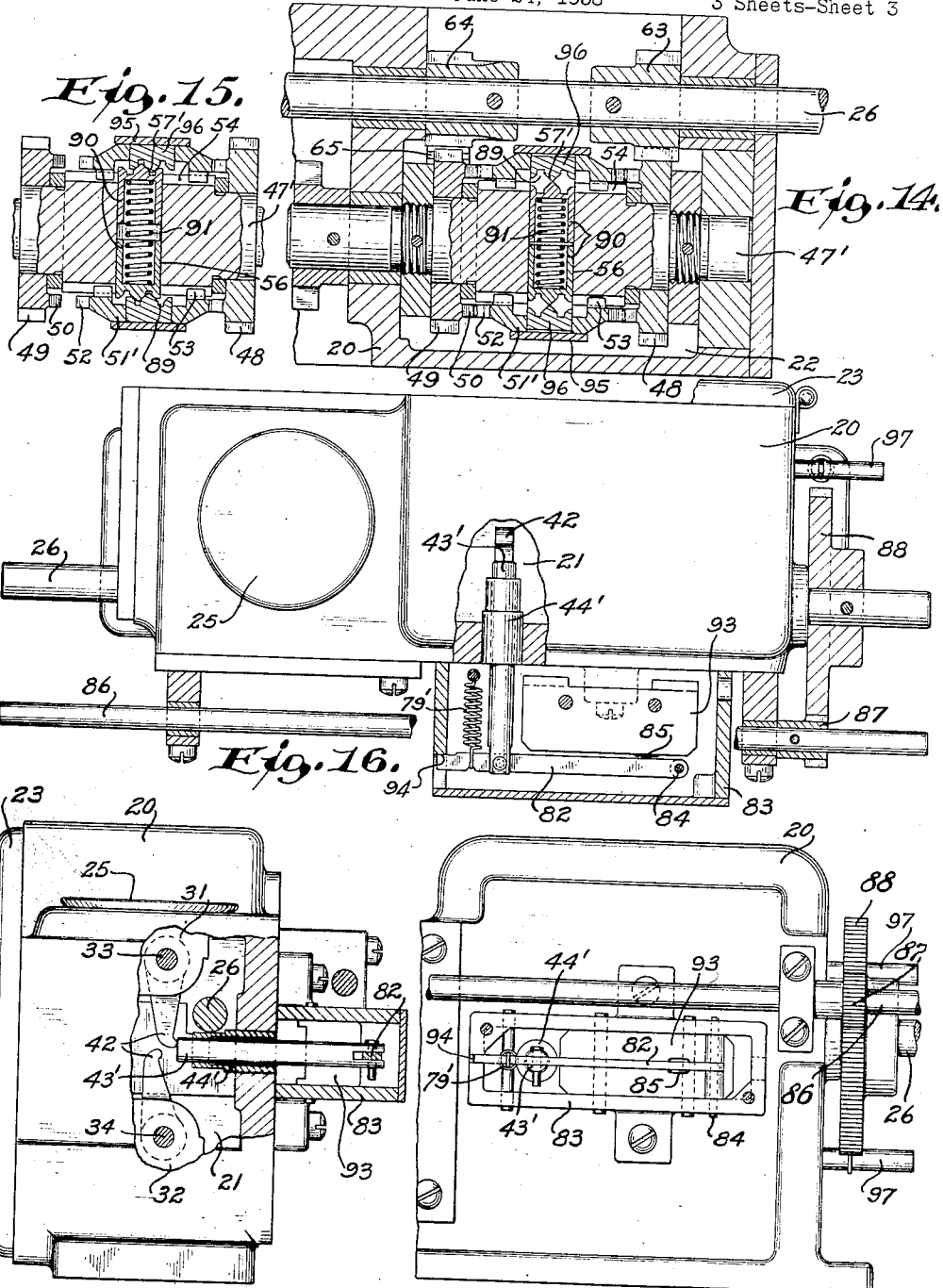

Patented Jan. 6, 1942

2,269,330

UNITED STATES PATENT OFFICE 2,269,330

COUNTER

Karl H. Andren and Kurth J. Papke, Milwaukee, Wis., assignors, by mesne assignments, to Counter and Control Corporation, Milwaukee, Wis., a corporation of Wisconsin Application June 24, 1938, Serial No. 215,567

7 Claims. (Cl. 235—132)

Our present invention relates generally to improvements in the art of registering a predetermined number of events or operations, or the like, and relates more specifically to improvements in the construction and operation of predetermined count apparatus or mechanism.

Generally defined, an object of our invention is to provide an improved predetermined number repeating counter, which is simple and compact in construction and highly efficient in use.

Many different types of counter mechanisms for registering successive machine operations or the like, have heretofore been proposed and used commercially. These counters are ordinarily associated directly with and are operable by a machine such as a loom, to count a predetermined number of operations and to automatically stop the machine or give a signal indication when the desired count has been completed. After such completion of the predetermined count, some of these prior devices are adapted to be manually reset in preparation of a repetition of the registering operation; and others of the prior devices are constructed to automatically register a definite number of successive subtraction operations so that the counter may be initially set to indicate the desired total number of operations and will show zero indication when the operations have been completed. So far as we know, none of the prior counter mechanisms are adapted to automatically reset themselves, nor are they capable of automatically repeating a predetermined count, nor are they able to perform simultaneous true addition and subtraction registration. Since all of these performances are extremely desirable under various conditions of use, the prior counters do not sufficiently meet the present commercial requirements in a satisfactory manner.

It is therefore a more specific object of our present invention to provide a new and useful counter mechanism which is adapted to automatically repeat the predetermined registering operations, which automatically resets itself, and which will register either true addition or subtraction.

Another specific object of the present invention is to provide an improved counting assemblage provided with two simultaneously operating counter units, one of which is adding up to a predetermined total while the other is subtracting from a like total, and wherein the operation of the two units is automatically reversed when the predetermined total is reached.

Another object of the invention is to provide an improved cycle controller for controlling the operation of a machine in definite cycles comprising any predetermined number of operations.

Another specific object of the present invention is to provide a control unit, which acts through intermediate mechanism such as an electric switch or fluid pressure control valves to operate a machine whenever a predetermined count has been completed, and wherein the counting operation is automatically reversed.

Another specific object of this invention is to provide a compact and durable cycle control device which can be manufactured and sold at moderate cost, which is entirely automatic in operation, and all parts of which are conveniently accessible for inspection and initial setting.

These and other specific objects and advantages will be apparent from the following detailed descriptions.

A clear conception of several embodiments of the invention, and of the mode of constructing and of operating counters built in accordance with the improvement, may be had by referring to the drawings accompanying and forming a part of this specification in which like reference characters designate the same or similar parts in the various views.

Fig. 1 is a partially dismantled longitudinal vertical section taken centrally through the counter wheels and reversing mechanism of one of our improved repeating counters, showing the reversing mechanism in neutral position;

Fig. 2 is a transverse vertical section through the counter of Fig. 1, taken along the line 2—2;

Fig. 3 is another transverse vertical section through the counter, taken along the line 3—3 of Fig. 1;

Fig. 4 is a part sectional front view of the counter assemblage with part of the front cover broken away, and the section taken centrally through the reversing mechanism which is shown in one extreme shifted position;

Fig. 5 is a developed section through the reversing mechanism of the same counter, the section being taken along the irregular line 5—5 of Fig. 3;

Fig. 6 is a longitudinal vertical section through the reversing mechanism, similar to Fig. 4, but showing this mechanism shifted into the other extreme position;

Fig. 7 is an enlarged central vertical longitudinal section through the clutch collar of the reversing mechanism;

Fig. 8 is a similarly enlarged end view of the reversing clutch collar of Fig. 7;

Fig. 9 is a likewise enlarged front view of one of the reversing pawls;

Fig. 10 is a similarly enlarged side elevation of the pawl of Fig. 9;

Fig. 11 is a transverse vertical section through one of the counter wheel series, taken between successive wheels, looking toward one side of one of the wheels;

Fig. 12 is a central longitudinal section through one of the counter wheels;

Fig. 13 is a section similar to that of Fig. 11, the lowest order counter wheels 27', 28' as shown in Fig. 2, is also provided with a series of laterally spaced integral fingers 78 one of each of which is also cooperable with a notch 41 of the corresponding counter wheel 27, 28. The latches 40 and the fingers 78 thereof are normally urged toward and against the cores 72 of the corresponding counter wheels 27, 28 by means of spring pressed plungers 77 carried by the brackets 31, 32 and coacting with the latches 40 as shown in Figs. 1 and 2; and when all of the fingers 78 and the latch 40 of a set engage the corresponding number wheel notches 41 as illustrated at the top of Fig. 2, then the corresponding lever arm 42 will engage the switch plunger 43 and will actuate the switch. This condition is attained only when all of the counter wheels 27 or 28 of a series have reached zero position, so that the switch will only be actuated by one arm 42 at any predetermined instant.

The switch mechanism which is operable by the improved counter may be either an electric or other switch assemblage adapted to either stop or to reverse the operation of a machine with which the counter is associated, or to start and stop auxiliary devices which do not operate the counter. As illustrated in Figs. 1 to 4 inclusive, this switch mechanism comprises the plunger 43 which is slidable within the casing 44 and is constantly pushed forwardly into the chamber 21 and toward the arms 42 by means of a compression spring 79. The rear end of the plunger 43 has a tapered contact portion 80 which is adapted to engage a sliding pin 81 which operates a switch to either make or break an electric circuit, when the plunger 43 is forced rearwardly against the action of the spring 79 as in Fig. 2. This switch mechanism may also be of the type shown in Figs. 16, 17 and 18, wherein the plunger 43' is likewise slidable in a casing 44' secured to the main housing 20, and is constantly urged toward the lever arms 42 by means of a spring 79' which however coacts with a lever or movable contact arm 82 pivotally attached to the rear end of the plunger 43'. The movable contact arm 82 is swingably mounted within a housing 83 by means of a pivot pin 84, and presses on a push button 85 on the switch housing 83, to either make or break an electric circuit, when the contact arm 82 is lifted off its seat 94 by means of one of the arms 42 coacting with the plunger 43'. As previously indicated, this switch mechanism may be either of the mechanical or electrical type and may be constructed to either close or open, depending upon the type of machine which is being controlled by the counter. The specific construction of the switch mechanism is therefore relatively unimportant so far as our present invention is concerned, and may be varied to perform the particular duty for which it is intended.

The improved reversing mechanism which is housed within the chamber 22 is however extremely important and with the gears 48, 49 formed with sets of five recesses or notches 50 engageable by five teeth or projections 52 of the clutch collar 51, it is preferable to drive the power shaft 26 from an auxiliary power shaft 86 through a pinion 87 and gear 88 having a driving ratio of one to five, as shown in Figs. 16 and 17. The reason for providing five notches in the clutch, is that with the two driving gears 48, 49 rotating oppositely, and each having five notches, a total of ten notches 50 will pass each other per revolution of the clutch shaft 47. This corresponds to the number of divisions on the number wheels, and therefore permits any desired predetermined number to be set up. The power shaft 26 may however be directly connected to the source, and the number of notches 50 and cooperating projections 52 may be varied to meet the desired operating conditions, without departing from the present invention, but must coordinate properly with the counter wheels. The arrangement should preferably be such, that the counter wheels 27, 28 will advance in either direction, a distance exactly equal to that between successive numerals 67, for each complete revolution of the shaft 86 or for each operation which is to be counted; and when the counter wheels 27 are revolving in one direction the wheels 28 are simultaneously revolving in the same direction, but the numerals 67 on the two series register opposite. The direction of rotation of the clutch collar 51 is therefore either clockwise or counter-clockwise, depending upon the position of the latches 55, and while these latches are shown in neutral or mid-position in Fig. 1, they will not in fact assume such a position when the mechanism is operating, except when the action of the counters is being reversed. As previously indicated, the gears 48, 49 are journalled for rotation upon the shaft 47, and are simultaneously rotatable in opposite directions, the gear 48 being driven direct from the power shaft 26 through the pinion 63, and the gear 49 being driven from the power shaft 26 through the pinion 64 and counter gear 65; but while the gears 48, 49 rotate oppositely, they do rotate at the same speed. With this assemblage of elements, the gear 46 which is carried by the shaft 47 and which meshes with the driving gears 45 of the counter wheels 27', 28' will rotate reversely in one direction when the collar 51 is shifted to one extreme position as shown in Fig. 4, and will rotate at the same speed in the opposite direction when the collar 51 is positioned as in Fig. 6. The power shaft 26 may continue to rotate in the same direction, or it may be stopped, or it may be caused to rotate in the opposite direction, depending upon the specific use or application of the counter.

In Figs. 14 and 15, we have illustrated a modified type of clutch mechanism for effecting automatic reversal of the direction of rotation of the counter wheels 27, 28. This modified clutch mechanism differs from that shown in Figs. 1 to 10 inclusive, primarily in the formation and disposition of the spring for actuating the latches 55, and in the formation of these latches. In the modified structure, the shaft 47' is quite similar to the shaft 47, and gears 48, 49 are journalled for free rotation upon the shaft 47' by means of pinions 63, 64 and counter gear 65 as previously explained. The clutch collar 51' is formed of four integrally united sections and has splines 53 coacting with grooves 54 in the shaft 47', and is also provided with V-shaped opposite end projections 52 which are alternately engageable with notches 50 formed in the gears 48, 49 respectively. The collar 51' has two diametrically opposite square holes in each of which a grooved block 96 is confined by an outer ring 95 which is pressed in place. Each block 96 has laterally spaced recesses 89 with either of which the square latches 90 are cooperable as shown in Fig. 15, when these latches 90 are forced outwardly within the transverse opening 56 in the shaft 47' by the compression spring 91. The latches 90 are therefore movable by direct spring pressure, instead of being movable through an intermediate plunger 58 as in Figs. 1 to 10 inclusive, but the functioning of the modified clutch mechanism of Figs. 14 and 15, is identical with that previously described.

During normal operation of our improved counter mechanism the counter wheels 27, 28 should be initially set the one to register the desired count and the other to zero, and this may be done by opening the front cover 23 and by setting the individual wheels 27, 28 after they have been released from the transfer pinions 35, 36 and from the drive pinion 46 with the aid of the manipulating pins 97. Assuming the mechanism to have been properly set as shown in Fig. 4, with the upper series of wheels 27 registering zero and the lower series of wheels 28 registering one hundred forty-four or one gross, the wheels 27 will then be prevented from rotating in one direction by the pawls 40. The machine with which the counter mechanism is associated, may then be provided either with stop mechanism for stopping the operation thereof when one gross of operations have been performed or a gross of articles have been completed, or to merely give a signal when such definite number of performances have been completed, or to continue successive counts of equal value, or to actuate auxiliary mechanism, while continuing its operation. After this initial setting of the counter mechanism has been accomplished, the cover 23 should be closed and the primary machine should be placed in operation, thereby automatically setting the gearing of the assemblage in motion, and causing the resistance to rotation of the counter wheels 27 in one direction imposed thereon by the pawl 40 and the corresponding finger 78 engaging the adjacent notch 41, to momentarily positively prevent rotation of the gears 45, 46 and shaft 47 in that direction. With shaft 47 stationary, the bevelled notches 50 on the engaged driving gear 48, 49 will force the splined clutch collar 51 along the shaft 47 into engagement with the opposite driving gear, thereby reversing the direction of rotation of the clutch ring 51 and thereby the shaft 47. While the collar 51 is moving along the spline on 47 the ridge 57' pushes the latches 55 together against the plunger 58 and the spring 62. After the clutch collar 51 has been pushed past the central plane, the spring 62, plunger 58, and latches 55 assist the clutch collar 51 in its movement, and finally hold this collar in engagement with the new driver. The gears 48 and 49 are so formed and positioned in relation to each other, that when shaft 47 is stopped, the teeth 52 enter into part engagement with notches 50 on the new driver while still engaged and driven by the previous driver. This arrangement makes sure that the clutch collar 51 is always pushed well past the center of the plungers 55 before its driver is disengaged, and also makes it impossible to skip a notch during clutching. This action of the pawls 40 and fingers 78 will always insure driving of the counter wheels 27, 28 in the proper direction after initial setting has been accomplished, and if the collar 51 had previously been shifted so that the proper gear 48 or 49 has been engaged, then there is no resistance afforded by the pawl 40 and fingers 78 engaging the notches 41. The upper series of counter wheels 27 will then proceed to register successive operations or performances by addition, and the lower series of wheels 28 will simultaneously register subtractions from the predetermined count, until one hundred forty-four or one gross of performances has been registered on the upper series of counter wheels 27, and zero has been registered by all of the wheels 28 of the lower series. The lower latch 40 and the fingers 78 thereof will then engage the notches 41 of all of the lower wheels 28 and will positively stop the rotation of this series. The arm 42 of the lower latch 40 will simultaneously actuate the switch plunger 43 to control the primary or any other machine in any desired manner, and if this machine is stopped by the actuation of the switch plunger 43, then the control mechanism will also stop. If, however, the machine continues to operate as is the case when successive counts of one hundred forty-four are to be registered, then the resistance afforded by the lower pawl 40 and fingers 78 coacting with the notches 41 of the wheels 28, will again act through the gears 45, 46 and shaft 47 to cause the V-notches 50 on the driving gear 48, 49 to force the clutch collar 51 along the shaft 47 into engagement with the other gear 48, 49, thereby reversing the direction of rotation of the clutch collar 51 and shaft 47. In other words, if the latches 55 were initially in the position shown in Fig. 4, then attainment of a desired predetermined count will automatically cause the latches 57 to move within the collar 51 into the position shown in Fig. 6, whereupon the action of the counter will be automatically reversed. It is noteworthy that the improved counter mechanism is not only automatically reversing, but is also automatic in its resetting action. As the addition on one of the counter wheel series continues, subtraction is simultaneously effected by the other series, and when a predetermined count has been reached on one of the counter units, a similar predetermined subtraction has been effected on the other. In the specific case illustrated, when a count of one hundred forty-four or one gross has been reached on the upper counter unit, the lower counter unit registers zero.

It is to be noted that the action of the improved reversing clutch mechanism shown in Figs. 14 and 15 is the same as that shown in Figs. 1 to 10 inclusive, and the reversing mechanism of this modification may be preferable since it subjects the latches 90 to somewhat less frictional resistance. The reversing mechanisms are however preferably immersed or confined in a suitable lubricant within the chamber 22, so that either of the mechanisms will operate satisfactorily. The switch mechanism of Figs. 16, 17 and 18 is perhaps more suitable for certain purposes than that shown in Figs. 1 to 6 inclusive, although the specific formation of the switch actuating mechanisms is relatively unimportant. The switch actuating mechanisms may obviously be arranged to perform any desired duty such as stopping the primary machine, actuating an auxiliary machine to index or the like, actuating a signal, or even reversing the primary machine.

The improved counter and reversing clutch mechanisms are so constructed and operable, that no count will be lost when the counter units are operating either to add or to subtract, thereby insuring true addition and subtraction. If either series of counter wheels 27, 28 is initially set to zero, the last numeral 61 to which the counter is set, will pull up so that about three fourths of this last number is visible through the corresponding opening 24. The other one quarter travel is utilized for the reversing operation which takes place while the wheels and numerals remain at rest. This action takes place on both series of counter wheels upon each reversal, but does not preclude correct and convenient reading of the total count registered through each of the casing openings 24. This automatic reversing of the direction of rotation of the counter mechanism during only a slight fraction of one counting operation, is an important feature of the present invention, and since the reversal is accomplished without losing a count, the total counts are always accurate.

From the foregoing detailed description of our improved counter mechanism, it will be apparent that we have provided an assemblage which is adapted to automatically repeat any desired predetermined number of counting operations, and which is furthermore adapted to automatically reset itself. The improved assemblage not only automatically performs its function, but also accurately performs the same, and constitutes a combined addition and subtraction counter unit which may be utilized for either purpose. The counter wheels 27, 28 are conveniently accessible for initial setting by merely opening the door cover 23 and releasing the individual wheels from the transfer pinions 35, 36, with the aid of the pins 97 secured to the brackets 31, 32, and when the cover 23 is closed, the brackets 31, 32 are effectively retained in position against the pin 70 by the spring 97' coacting with the pins 97, so that the gears 74 of the wheels 27, 28 can not become disengaged from the transfer pinions. The entire assemblage is extremely simple and compact considering the utility of the structure, and all portions of the mechanism are effectively protected against possible damage. The mechanism has proven highly satisfactory in actual operation, and has been found to register true additions and subtractions and to be operable with minimum expenditure of power. The improved counter is also extremely advantageous as a cycle controller for controlling the functioning of a machine in definite cycles comprising a series of predetermined number of operations, and may be readily utilized to cooperate either directly with the controlled machine, or through intermediate mechanism such as an electric switch or fluid pressure control valves.

It is to be understood that it is not desired to limit this invention to the exact details of construction or to the precise mode of operation, herein shown and described, for various modifications within the scope of the claims may occur to persons skilled in the art.

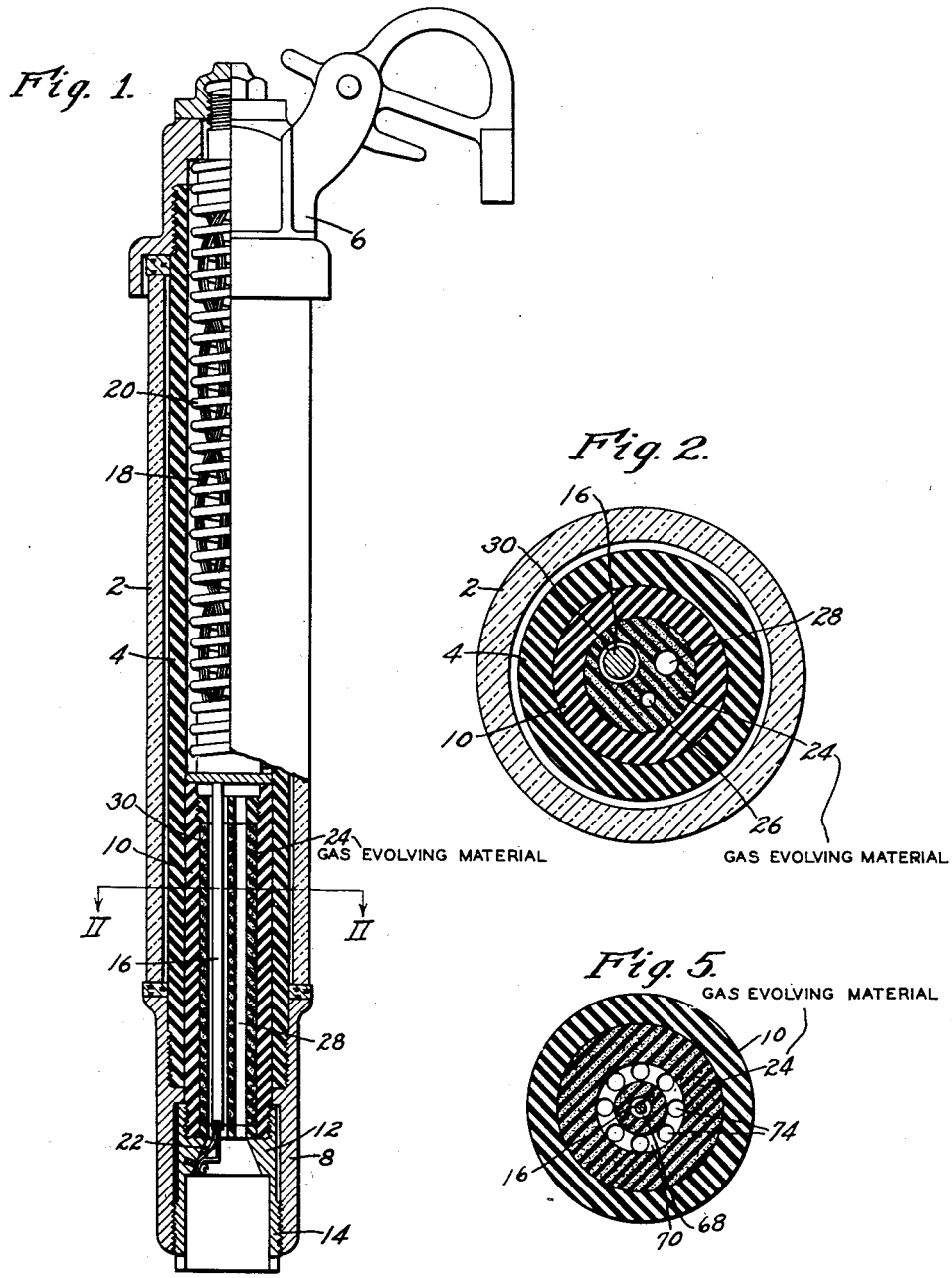

We claim:

1. A registering device comprising, two counters, gearing for simultaneously actuating said counters, a shaft for driving said gearing, forward and reverse driving gears for said shaft, a collar movable along said shaft to interchangeably connect said forward and reverse gears therewith, cam means interposed between each of said gears and said collar for initiating movement of the collar away from the active gear and toward the inactive gear whenever rotation of the active gear is arrested, latches carried by said shaft and coacting with said collar to complete each collar movement initiated by either of said cam means, and means coacting directly with said counters for effecting actuation of said cam means and latches to reverse the movement of said collar whenever one of said counters has attained a predetermined count.

2. A registering device comprising, two counters, gearing for simultaneously actuating said counters, a shaft for driving said gearing, forward and reverse driving gears journaled on said shaft, a clutch collar movable along said shaft to interchangeably drivingly connect said forward and reverse gears therewith, said collar having a central reversing ridge, cam means interposed between each of said gears and said collar for initiating movement of the collar away from the active gear and toward the inactive gear whenever rotation of the active gear is arrested, latches carried by said shaft and coacting with said ridge to complete each collar movement initiated by either of said cam means, resilient means for urging said latches toward collar retaining position, and means coacting directly with said counters for causing said cam means and latches to overcome the resilient urging force acting thereon and to cooperate with said reversing ridge to reverse the movement of said collar whenever one of said counters has attained a predetermined count.

3. A registering device comprising two counters each having a series of operatively connected numeral wheels of successively higher orders, gearing for simultaneously rotating the units wheels of said counters, a reversing clutch for transmitting a drive to said gearing, and means for reversing said clutch whenever the wheels of one of said counters are positively stopped.

4. A registering device comprising two counters each having a series of operatively connected numeral wheels of successively higher orders, means for positively stopping all of the wheels of each of said counters, a reversing clutch for transmitting a drive to the lowest order wheels of said counters, and means for reversing said clutch whenever the wheels of one of said counters are positively stopped.

5. A registering device comprising two counters each having a series of operatively connected numeral wheels of successively higher orders, latch means for positively stopping the rotation of the wheels of each counter when said wheels register zero position, gearing for simultaneously rotating the lowest order wheels of both of said counters, a reversing clutch for transmitting a drive to said gearing, and means for reversing said clutch whenever one of said latch means becomes effective.

6. A registering device comprising two counters each having a series of operatively connected numeral wheels each provided with a peripheral stop, said stops being so positioned with relation to the numerals on their respective wheels that a zero reading is had at the sight opening when each stop is in effective position, a latch cooperable with all of said wheel stops of each counter, and a reversing mechanism for automatically reversing the direction of rotation of said counters whenever one of said latches becomes effective.

7. In a counter, registering means, oppositely rotatable driving members, a shaft having radially movable pawls, and a clutch collar automatically movable along said shaft by said pawls and by one of said driving members into driving engagement with the other to reverse the action of said registering means.

KARL H. ANDREN.
KURTH J. PAPKE.